US012147801B2

(12) United States Patent
Soldano et al.

(10) Patent No.: US 12,147,801 B2
(45) Date of Patent: Nov. 19, 2024

(54) SOFTWARE AIDED GOVERNANCE FOR PROJECT CONTRIBUTION ON SOURCE CODE MANAGEMENT (SCM) AND CONTINUOUS INTEGRATION (CI) ENVIRONMENTS

(71) Applicant: Red Hat, Inc., Raleigh, NC (US)

(72) Inventors: Alessio Soldano, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 196 days.

(21) Appl. No.: 17/860,948

(22) Filed: Jul. 8, 2022

(65) Prior Publication Data

US 2024/0012637 A1 Jan. 11, 2024

(51) Int. Cl.
G06F 9/44 (2018.01)
G06F 8/71 (2018.01)
G06F 11/34 (2006.01)

(52) U.S. Cl.
CPC .......... G06F 8/71 (2013.01); G06F 11/3428 (2013.01)

(58) Field of Classification Search
None
See application file for complete search history.

(56) References Cited

U.S. PATENT DOCUMENTS

| | | | |
|---|---|---|---|
| 8,533,676 B2 | 9/2013 | Watters et al. | |
| 9,916,224 B2 | 3/2018 | Macleod et al. | |
| 10,783,065 B2 | 9/2020 | Allen et al. | |
| 11,016,738 B2 | 5/2021 | Hoffmann et al. | |
| 11,150,898 B1* | 10/2021 | Kesiboyana | G06Q 10/06398 |
| 2010/0095277 A1* | 4/2010 | Cheng | G06F 8/71 717/127 |
| 2014/0331203 A1* | 11/2014 | Elshishiny | G06F 11/3676 717/124 |
| 2019/0050814 A1* | 2/2019 | Surkov | G06F 21/6254 |
| 2020/0394588 A1* | 12/2020 | Sanchez | G06F 8/75 |
| 2021/0011712 A1* | 1/2021 | Grant | G06F 11/3616 |
| 2021/0089434 A1 | 3/2021 | Dhanda et al. | |

(Continued)

OTHER PUBLICATIONS

Zhendong Wang et al. "Unveiling Elite Developers' Activities in Open Source Projects" arXivLabs, Aug. 22, 2019.

(Continued)

*Primary Examiner* — Wei Y Zhen
*Assistant Examiner* — Lanny N Ung
(74) *Attorney, Agent, or Firm* — Womble Bond Dickinson (US) LLP (57) ABSTRACT

Techniques for processing change requests for software projects are disclosed. An example method includes generating a contributor score for a contributor of source code to a software project and saving the contributor score to a storage device. The contributor score reflects a degree to which source code submissions by the contributor are trustworthy. The method also includes receiving a change request from the contributor to change a part of the software project. The change request includes new or updated source code for the software project. The method also includes, in response to receiving the change request, retrieving the contributor score from the storage device, comparing, by a processing device, the contributor score to a threshold to identify an action to be performed in relation to the change request, and executing the action.

14 Claims, 8 Drawing Sheets

(56) References Cited

U.S. PATENT DOCUMENTS

2021/0141718 A1\* 5/2021 Sandhu ..................... G06F 8/60
2022/0066773 A1\* 3/2022 Mampilly ................. G06F 8/77
2023/0237165 A1\* 7/2023 Prasad ................... G06N 20/20
　　　　　　　　　　　　　　　　　　　　　　　　726/26

OTHER PUBLICATIONS

Mark Aberdour "Achieving Quality in Open-Source Software" IEEE Software vol. 24, Issue 1, Jan. 8, 2007.
Vipin Balachandran "Reducing human effort and improving quality in peer code reviews using automatic static analysis and reviewer recommendation" IEEE 2013 35th International Conference on Software Engineering, May 18, 2013.

\* cited by examiner

SOFTWARE AIDED GOVERNANCE FOR PROJECT CONTRIBUTION ON SOURCE CODE MANAGEMENT (SCM) AND CONTINUOUS INTEGRATION (CI) ENVIRONMENTS

TECHNICAL FIELD

Aspects of the present disclosure relate to source code management, and more specifically to processing requests for changes to source code.

BACKGROUND

Source code is a fundamental component of a computer program that is created by a programmer. Large software projects may include several software modules that are written by a group of programmers. The generated source code may be stored to a source-code repository, which may be maintained by source code management (SCM) system that archives source code, documentation, web pages, and other works, accessible either publicly or privately. Such SCM systems are often used by open-source software projects and other multi-developer projects to maintain revision and version history, or version control.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Aspects of the present disclosure relates to techniques for processing requests to change source code within a project, such as an open source project, for example. Software projects may include several modules of source code that operate together. The source code is usually generated and updated by various community members that are able to contribute source code by submitting requests for changes to the code base. Such requests to make changes to the code base are often referred to as pull requests.

Such contributions are usually beneficial in that new functionalities can be added, existing ones can be tuned, and existing bugs or security vulnerabilities can be fixed or prevented. However, any collaboration across multiple actors offers implicit governance challenges. For example, the quality of the contributions may not always be high. Accordingly, requests for changes are often reviewed by experienced developers that are designated to review the proposals to ensure that the modification does not affect the overall quality of the project or, more in general, the changes are aligned with the project contribution expectations. Unfortunately, reviewing code can be very complex, depending on the proposal being processed.

Requests for changes are usually raised against source code management (SCM) systems which are often coupled with continuous integration (CI) environments. In continuous integration environments, projects are constantly tested to early detect (and hence prevent) regressions in terms of functionalities and/or performance. In the case of complex projects, though, performing full testing each time a new source code contribution is received is not always feasible due to the time or resource costs for the execution.

Furthermore, reviewing software change requests is an imperfect process that relies on user intuition and can possibly be subject to bias. For example, the reviewer of a change request may overestimate or underestimate the trustworthiness of a particular contributor based on a limited number of personal experiences with previous change requests from that contributor. If trustworthiness is overestimated, the change request may be subjected to less scrutiny, possibly leading to the acceptance of lower quality code. If trustworthiness is underestimated, the change request may be subjected to unnecessary rounds of review and code performance testing, resulting in wasted resources.

Embodiments of the present disclosure provide a system configured to evaluate change requests submitted by developers. The system may be configured to automatically assess the risks of the change request, select the developer reviewers that are best able to review a given contribution effectively, and select the subset of project tests to run for verifying a given contribution. In this way, the system is able to increase the project quality and decrease the review costs. Additionally, the techniques described herein provide a more accurate estimate of contributor trustworthiness that is more objective and less subject to bias. For example, a contributor score can be computed for each contributor based on a comprehensive, rule-based analysis of most or all of the contributor's previous change requests and code submissions. Additionally, contributor scores can be determined differently for different parts of the project and at different levels of granularity. For example, a contributor score may be determined at the project level, module or component level (where a project is made of several modules and components), class level, and/or method level.

Figure 1:
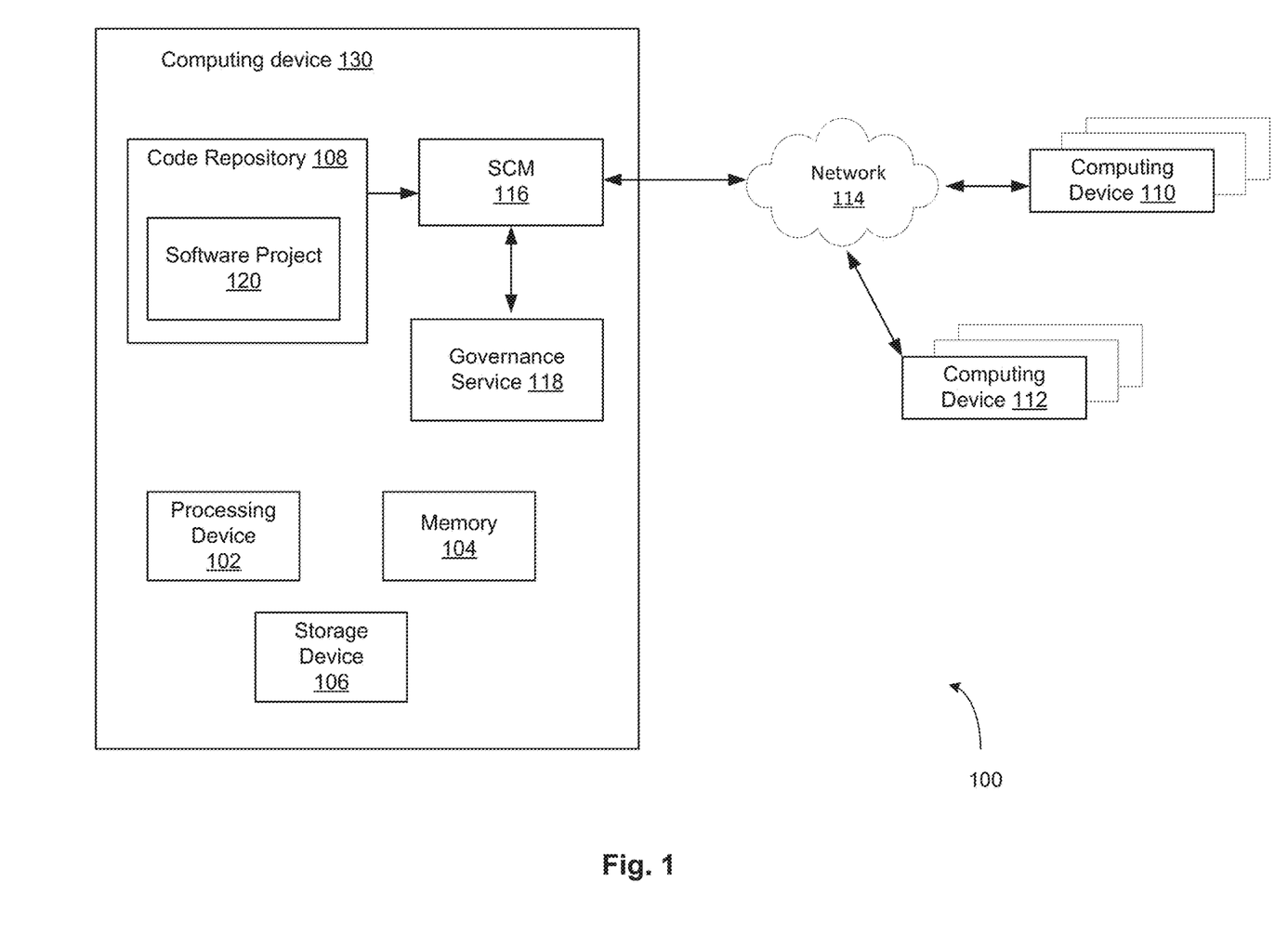
FIG. 1 is a block diagram of an example of a computer system in accordance with some embodiments of the present disclosure.

FIG. 1 is a block diagram of an example system 100 in accordance with some embodiments of the present disclosure. One skilled in the art will appreciate that other architectures are possible for system 100 and any components thereof, and that the implementation of a system utilizing examples of the invention are not necessarily limited to the specific architecture depicted by FIG. 1. The system 100 may be a cloud-based infrastructure or non-cloud-based system such as a personal computer, one or more servers communicatively coupled through a network, and other configurations. The system 100 may include a computing device 130, computing device 110, and computing device 112, which may be coupled to each other (e.g., may be operatively coupled, communicatively coupled, may communicate data/messages with each other) via network 114. Network 114 may be a public network (e.g., the internet), a private network (e.g., a local area network (LAN) or wide area network (WAN)), or a combination thereof. In one embodiment, network 114 may include a wired or a wireless infrastructure, which may be provided by one or more wireless communications systems, such as a WiFi™ hotspot connected with the network 114 and/or a wireless carrier system that can be implemented using various data processing equipment, communication towers (e.g. cell towers), etc. In some embodiments, the network 114 may be an L3 network. The network 114 may carry communications (e.g., data, message, packets, frames, etc.) between computing devices 110, 112, and 130.

Each computing device may comprise any suitable type of computing device or machine that has a programmable processor including, for example, server computers, desktop computers, laptop computers, tablet computers, smartphones, set-top boxes, etc. In some examples, each of the computing devices 110, 112, and 130 may comprise a single machine or may include multiple interconnected machines (e.g., multiple servers configured in a cluster). The computing devices 110, 112, and 130 may be implemented by a common entity/organization or may be implemented by different entities/organizations. For example, computing device 130 may be operated by a first company/corporation and one or more computing devices 110 may be operated by a second company/corporation.

The computing device 130 can include one or more processing devices 102 (e.g., central processing units (CPUs), graphical processing units (GPUs), etc.), main memory 104, which may include volatile memory devices (e.g., random access memory (RAM)), non-volatile memory devices (e.g., flash memory) and/or other types of memory devices, and a storage device 106 (e.g., one or more magnetic hard disk drives, a Peripheral Component Interconnect [PCI] solid state drive, a Redundant Array of Independent Disks [RAID] system, a network attached storage [NAS] array, etc.). In certain implementations, main memory 104 may be non-uniform access (NUMA), such that memory access time depends on the memory location relative to processing device 102. The storage device 106 may be a persistent storage and may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The storage device 106 may be configured for long-term storage of data and may retain data between power on/off cycles of the computing device 110. It should be noted that although, for simplicity, a single processing device 102, main memory 104, storage device 106, are shown, other embodiments may include a plurality of processing devices, memories, storage devices, and devices. Additionally, the computing device 130 may have additional components not shown in FIG. 1. Computing devices 110 and 112 may comprise similar architectures.

The system 100 may be used for software development and version control and may be accessible through a network such as the Internet. The system 100 may include or have access to a code repository 108 that store modules of source code, which may be organized into software projects 120. Each software project 120 may include several interoperable source code modules that can be merged together and used to serve various functions. The source code may be written in any suitable language, including Python, Java, Javascript, C, C+, C++, and others.

The source code modules stored to the code repository 108 may be accessed by one or more software developers via computing device 110 and computing device 112. More specifically, computing device 110 may be utilized by contributors (one type of software developer) to the source code modules stored in code repository 108 while computing device 112 may be utilized by reviewers (another type of software developer) of the source code modules stored in code repository 108. Thus, contributors and reviewers can access the computing device 130 from computing device 110 and computing device 112 respectively through the network 114.

Contributors are developers that are able to access source code and make programming changes to the source code through change requests. Change requests may be sent to computing device 130 through a source code manager (SCM) 116, which provides various functions including version control for example. The SCM 116 may be configured to track changes to source code, commit source code changes to the repository, backup and restore source code files, undo source code changes, and other functions. In some embodiments, the SCM 116 may control the performance testing of source code changes.

The SCM 116 can also be used to enable reviewers to reviews source code changes provided by contributors. Reviewers may also sometimes be contributors in that they can also submit change requests. For example, a reviewer may be a contributor that has been manually designated as a possible reviewer by a system administrator. In some embodiments, reviewers may be automatically identified as possible reviewers based on achieving a contributor score above a specified threshold.

In various embodiments, source code changes committed to the code repository 108 include metadata such as a unique author ID that identifies the developer who authored the code and a commit message that describes the change. Contributors and reviewers can also use the SCM 116 to pull selected source code modules for editing and/or review, in which case the SCM 116 can ensure that the latest version of the source code is being provided. Various additional functionalities may be provided by the SCM 116.

In a typical source code update scenario, a contributor may send change request to the SCM 116. The SCM 116 can then flag the provided source code as requiring testing or review. Before being committed to the repository, the source code module can be stored to a temporary location to be subject to review and/or testing. A user, such as a system administrator, may evaluate the change request and assign one or more reviewers to review the source code. The selection of the reviewer may be based on the user's personal knowledge about the particular source code affected and the expertise, experience, and/or availability of each of the reviewers.

In some cases, one or more rounds of testing may also be performed on the source code. The testing may involve running the software module alone and/or in combination with other source code modules in the project and collecting data related to software performance. The collected data may include application metrics (e.g., execution times) collected via tracing, bottle neck analysis, and others. The data can also include computing platform metrics such as processor utilization, memory utilization, network bandwidth utilization, and others. The collected data may be evaluated to determine the performance effects of the source code module and may be compared to a previous version of the source code module. Once the source code has been reviewed, tested, and determined to be acceptable, the SCM 116 can commit source code module to the repository.

As explained above, decisions about whether to review source code associated with change requests, what reviewer or reviewers to assign to particular, what tests to run to verify performance can be made by a user such as a system administrator. Such decisions would typically be based on the personal knowledge of the system administrator, for example, the administrator's knowledge about the project, the source code, the contributors, and the reviewers. However, this can be cumbersome depending on the size of the project and the number of change requests to be handled.

In accordance with embodiments of the present techniques, some or all of the decisions regarding the review, testing, and acceptance of source code change requests may be made automatically (i.e., without human involvement). The computing device 130 may include a governance service 118 that can be configured to continuously analyze project information and build up a collection of metadata to be used for performing evaluations on incoming change requests. The governance service 118 may be configured to monitor a specific project to generate the metadata and, once enabled, it can be triggered upon any change request a project receives.

Each time a new change request is received, the governance service 118 can be invoked by the SCM 116 to process the change request automatically according to a set of governance rules and strategies. For example, the governance service 118 may be configured to automatically assess the risks of the source code contribution associated with the change request, select the developers that are best placed to review a given contribution, and select a subset of project tests to run for verifying a given contribution, among other functions. In some embodiments, the governance service 118 may be customized by the user to tailor the governance rules and strategies to a specific project.

In some embodiments, the governance service 118 may generate a report to be displayed to the user. The report may include various information about the change request, such as the affected code modules, the identity of the contributor, the risk presented by the change update, the recommended reviewers, the recommended tests, and other information. The user may then use the report to make decisions about the change request, such as whether to accept or reject it, what tests to run, what reviewers to assign to review the source code, and others. In some embodiments, some actions may be taken by the governance service 118 automatically. For example, the governance service 118 may assign one or more particular reviewers to review a particular change request and send notifications to the reviewers without the involvement of a human user. The governance service 118 may also be configured to automatically accept or reject a change request, automatically schedule a round of specific performance tests, and others. A more detailed example of a governance service in accordance with embodiments is shown in FIG. 2.

Figure 2:
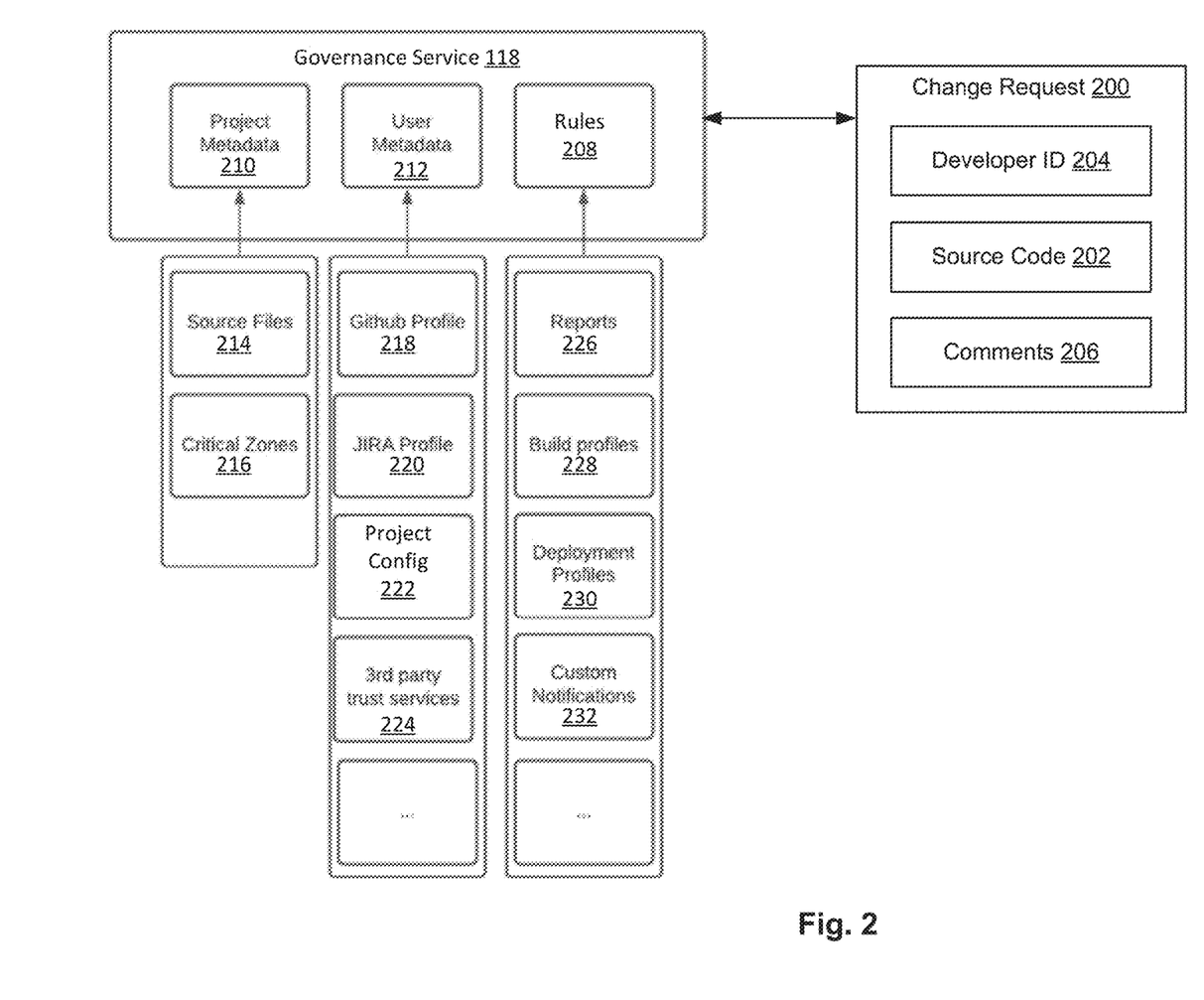
FIG. 2 is a block diagram of an example governance service in accordance with some embodiments of the present disclosure.

FIG. 2 is a block diagram of an example governance service 118 in accordance with some embodiments of the present disclosure. The governance service 118 may be implemented in hardware or a combination of hardware a software and any suitable type of computing architecture.

The governance service 118 can receive change requests 200 from developers. Change requests 200 may be received, for example, from an SCM such as the SCM 116 of FIG. 1. Each change request 200 may include source code 202 and metadata such as a unique developer ID 204, comments 206 that describe the changes implemented by the source code, and other types of metadata.

Upon receiving a change request, the change request can be processed to generate one or more actions, which may be based, at least in part, on project metadata 210, user metadata 212, and rules 208. The project metadata 210 can be used to determine different grades of risk for different parts of a project. For example, the project metadata 210 may include the source code files 214, which may include data that is usually attached to the source code files such as SCM details like version number, commit comments, and others.

The project metadata 210 can also include additional metadata that identifies critical zones 216, i.e., source code files that are of particular importance to the operation of the software. The critical zone metadata 216 may be attached to or embedded in the source code files 214 or may be included in a separate file that makes reference to the source code files or portions thereof. The identification and flagging or scoring of critical zones may be based on user knowledge. For example, if a particular source code file is more relevant to the secure and effective operation of the software, the user may manually flag the source code as critical or apply a relevance score commensurate with the importance of the source code. For example, servlets are often used to generate Web service responses to requests from clients. Due to the relative importance of this communication, any source code that makes use of servlets may be flagged as critical or given a high relevance score. Other types of source code that may be identified as highly relevant can include source code that makes of security related packages or multi-threading related packages.

The identification of critical zones 216 can also be performed automatically based on performance tests of the software package. For example, critical zones may be identified by monitoring behavior of the computing system during normal execution of the software. The monitoring may determine, for example, that a particular code module consumes more computing resources, i.e., uses more processor time, more memory utilization, memory accesses, network bandwidth, etc. Those code modules that consume more computing resources may be automatically identified as critical or assigned a high relevance score. In some embodiments, the relevance score may be generated for each code module in proportion to the relative level of computing resources consumed.

The user metadata 212 can be any information that describes the reliability, competence, or trustworthiness of the developer submitting the change request 200. In some embodiments, some of the user metadata may be entered manually based on user knowledge. For example, the administrator or owner of a particular project may identify particular contributors as trusted developers based on the project owner's knowledge about the competence and trustworthiness of the contributors. This user metadata may be entered as part of a project specific configuration.

At least some of the user metadata 212 may be obtained from external resources such as software developer communities or resources like GitHub, JIRA and others. This external resource metadata may be obtained, for example, through custom plugins configured to comb through publicly available information related to the contributor's expertise, reputation in the community, skill level, and the like.

Information from GitHub related to previous commits and pull requests may be used to generate a GitHub profile 218 for developers in the GitHub community. For example, the previous commits of GitHub developers may be used to generate a contributor score as described further in relation to FIG. 3. Information from JIRA may be used to generate a JIRA profile 220 that describes the JIRA contents for a particular issue being addressed by a particular change request 200. For example, if the issue addressed by a change request is similar to an issue that can be tracked in JIRA, then the user's trust level may be increased if the user's JIRA profile indicates extensive experience with that issue.

In some embodiments, some user metadata 212 may be obtained through a third party service 224 that rates software developers. For example, such a third party service may indicate the experience or skill level that particular developers have with respect to different software packages, technology areas, etc.

The governance service 118 may be configured to generate one or more actions based on the project metadata 210, user metadata 212, and the rules 208. In some embodiments, the rules may be customized by the administrator to achieve a desired result for a particular project. In some embodiments, one or more rules may determine the input used to populate a report 226. The report 226 may include any type of information that can help the user make a decision about a particular change request. For example, the report 226 may include the identity of the contributor and a trust level attributed to the contributor, which may be a general trust level or a trust level pertinent to the specific change request. The report 226 may also identify specific reviewers that may be better situated to review the source code contained in the change request. The report 226 may also indicate whether the project software should be tested and, if so, what tests should be performed.

Some actions may be performed automatically. For example, the governance service 118 may identify parts of the project that should be tested using the new source code. Build profiles 228 and deployment profiles 230 may be generated automatically to specify how to build and deploy the current software project by, for example, controlling the source code modules to include, the tests to run, etc.

The governance service 118 may also automatically generate notifications and send the notifications to identified developers or administrators. For example, if governance service 118 identifies one or more source code reviewers, a notification may be send alerting the reviewers as to the work assignment.

Various rules and strategies may be implemented by the governance service. Some examples are described below in relation to FIGS. 3, 4, and 5. It will be appreciated that these are example embodiments and that additional techniques may be implemented without deviating from the scope of the claims.

Figure 3:
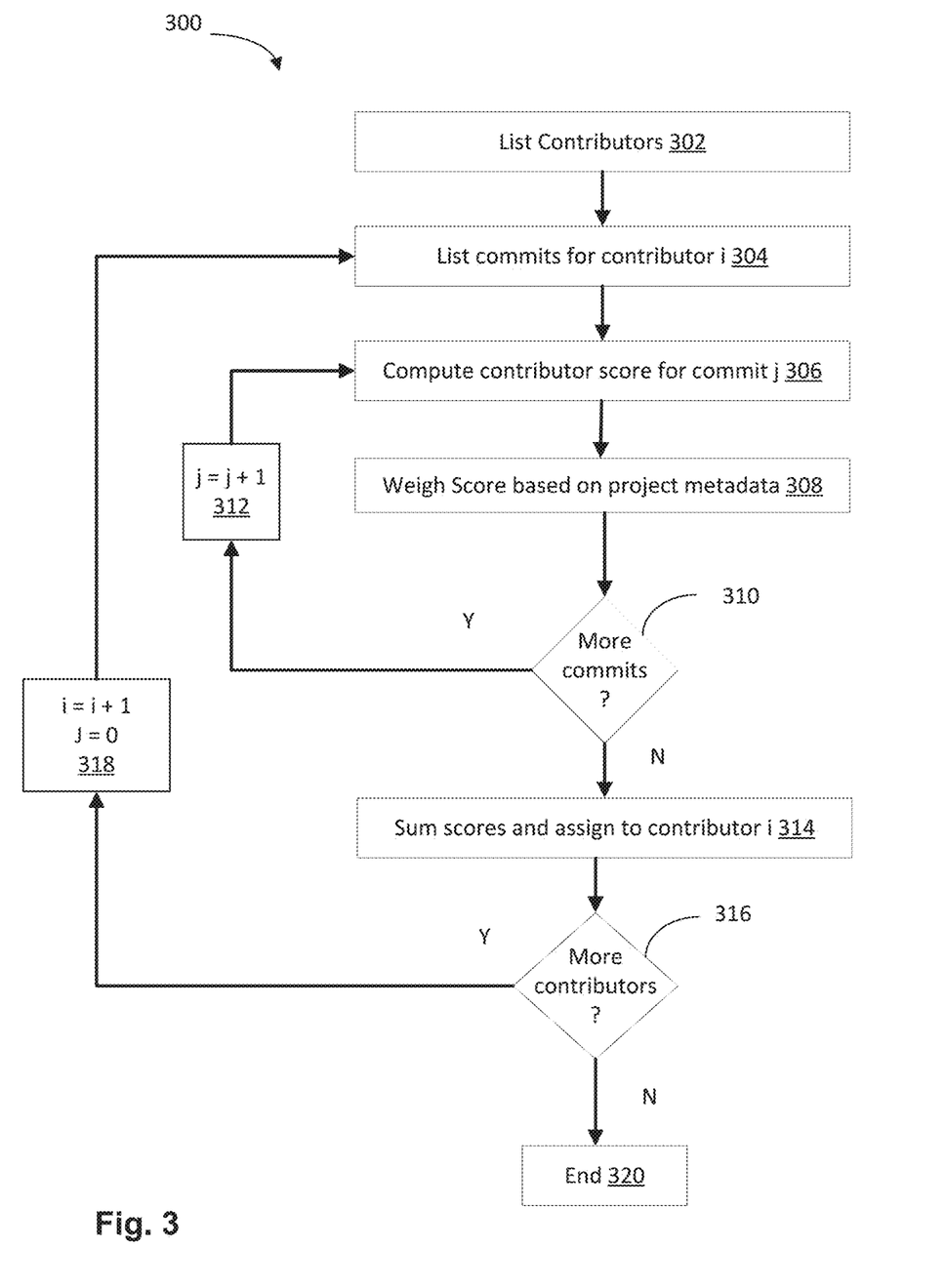
FIG. 3 is a method of generating a contributor score, in accordance with some embodiments of the present disclosure.

FIG. 3 is a method of generating a contributor score, in accordance with some embodiments of the present disclosure. Method 300 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by the governance service 118 shown in FIGS. 1 and 2. The method may begin at block 302.

At block 302, the governance service can obtain a list of all of the contributors that have written code for the project, i.e. contributors that have submitted change requests that were accepted and committed to the repository.

At block 304, all the commits for a first contributor (contributor i) are obtained. The commits are used to generate one or more contributor scores for the contributor as shown in blocks 306-314. There may be various strategies for generating the contributor score, some of which are described herein.

At block 306, an initial contributor score is computed for commit j. In some embodiments, the initial contributor score may be computed based on evaluating the complexity of the changeset, which describes the changes between the current version of the source code and the source code associated with the change request. For example, the complexity may be determined based on the number of changed lines of code and/or the number of added or removed methods. The complexity may also be determined by searching for specific keywords in the source code. For example, the use of concurrency in a change set may be an indication of a high level of complexity. In Java, the use of concurrency may be indicated by the keyword "synchronized." Other specific technology related keywords may also be searched for depending on the concept and the programming language. A higher complexity may result in a higher contributor score.

The initial contributor score may also be determined based on how much (if any) of the previously committed source code is still in the current version of the source code (e.g., the head of the relevant project branch or branches) and has not been amended. A higher amount of intact code may result in a higher contributor score.

The initial contributor score may also be determined based on code testing and documentation. For example, the initial contributor score may be based on code coverage percentage (i.e., how many executable lines of code in a contribution have been exercised by test methods), or the presence of a Javadoc in the commit. Javadoc is a mechanism for adding code documentation within the codebase. The presence of a Javadoc in the code reduces the chances of misunderstanding when reading and/or modifying the code in the future and allows checking that the intentions of the code author are commensurate with the code's actual operation. Accordingly, the presence of a Javadoc may increase the contributor score. In some embodiments, the initial contributor score may be based on one or a combination of the techniques described in relation to block 306. Other techniques may also be possible.

At block 308, the initial contributor score may be weighted based on project metadata. The weighting applied may be related to the relevance of the classes, packages, or components affected by the commit. For example, changes in a given section or component of the project might be more relevant, for example, if it is on a critical path for common usage scenarios. Accordingly, if the commit effects more portions of a project that have been identified as critical, then the initial contributor score computed for that commit may be weighted more heavily. In some embodiments, the initial contributor score may be weighted based on the relevance score assigned to the project sections affected by the commit. Other techniques or considerations are also possible.

At block 310, a determination is made regarding whether there are additional commits to be scored for the contributor. If there are additional commits, the process flow advances to block 312, the commit index j is incremented, and the process flow returns to block 306. This process continues until all of the commits for the contributor have been scored. If at block 310, there are no more commits to score, the process flow advances to block 314.

At block 314, the weighted scores for each commit may be summed to generate one or more contributor scores for the contributor. In some embodiments, a project level contributor score may be computed as the sum or average of all of the weighted contributor scores for all of the commits associated with the contributor. In some embodiments, plural contributor scores may be computed for different levels of granularity, wherein each contributor score applies to a different section of the project. The contributor score for a particular section of the project (e.g., a particular module, component, class, or method) may be computed based on the commit scores relevant to that section. Accordingly, a contributor might have a high credit or reputation in one area of the project and a lower one in a different area of the project.

At block 316, a determination is made regarding whether there are additional contributors to be scored. If there are additional contributors, the process flow advances to block 318, where the contributor index is incremented and the commit index j is reset (e.g., set to 0). The process flow returns to block 304 and the process described above is repeated for the next contributor.

If at block 316, there are no more contributors to score, the process flow advances to block 320 and the process ends. The generated contributor scores may be stored as user metadata 212 for use when processing a specific change request. It will be appreciated that embodiments of the method 300 may include additional blocks not shown in FIG. 3 and that some of the blocks shown in FIG. 3 may be omitted. Additionally, the processes associated with blocks 302 through 318 may be performed in a different order than what is shown in FIG. 3.

Figure 4:
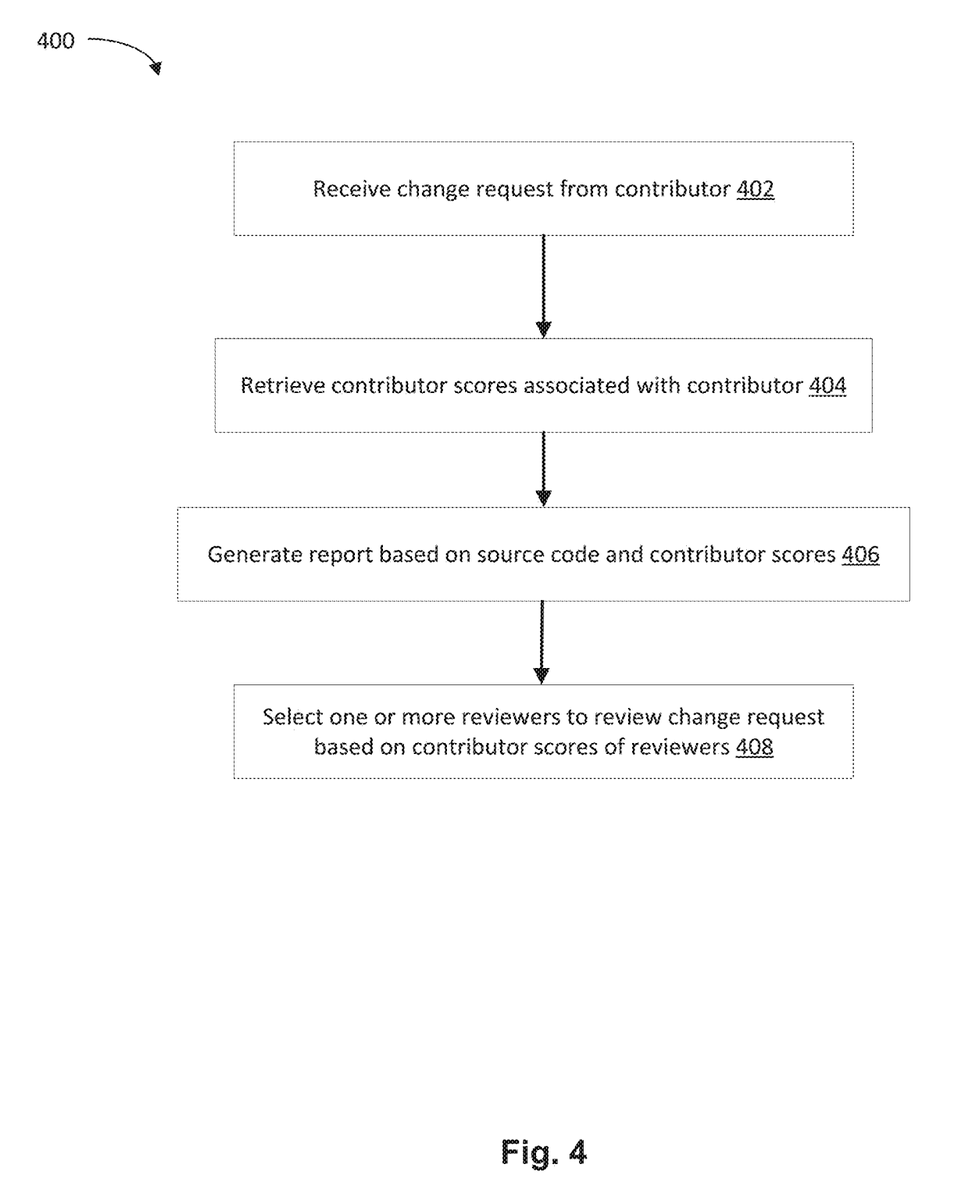
FIG. 4 is a method of processing a change request, in accordance with some embodiments of the present disclosure.

FIG. 4 is a method of processing a change request, in accordance with some embodiments of the present disclosure. Method 400 may be performed by processing logic that may comprise hardware, software, firmware, or a combination thereof. In some embodiments, at least a portion of method 400 may be performed by the governance service 118 shown in FIGS. 1 and 2. The method may begin at block 402.

At block 402, a change request is received from a contributor. The change request can include one or more source code files and a user ID that identifies the contributor submitting the change request. Additional metadata may also be included.

At block 404, the contributor score or scores associated the user submitting the change request may be retrieved. For example, the scores may be the scores generated as described in relation to FIG. 3 and stored to the user metadata. In some cases, there may be a single contributor score that describes an overall trust level for the project. In some embodiments, the contributor may have different contributor scores for different parts of the project, to reflect the varying trust levels that may apply at various levels of granularity based on the quality of the contributor's previous contributions. For example, the contributor may have a higher score in relation to some classes, and a lower score or no score in relation to other classes.

At block 406, a report (or a portion thereof) may be generated based on the contributor scores and the source code. In some embodiments, the source code's changeset may be listed and a contributor score shown for each entry in the changeset. The contributor score for a particular entry describes the users trust level with respect to that portion of the project. There may be various ways of displaying the data. For example, rather than displaying a numerical score, different portions of the source code could be highlighted using a different color depending on the corresponding contributor score.

At block 408, one or more contributors are selected as reviewers. The selection of reviewers may be performed automatically using the contributor scores generated as described in relation to FIG. 3 and stored to the user metadata. In some embodiments, a certain number of the highest ranked contributors for the code affected by the change request are selected as reviewers. Once the reviewers are selected, the governance service may cause a notification to be sent to each reviewer automatically, i.e., without human involvement. In some embodiments, the selected reviewers may be included in a report, such as the report generated at block 406, and the system administrator can make the final decision regarding whether to review particular portions of the code and who should be assigned as the reviewer.

It will be appreciated that embodiments of the method 400 may include additional blocks not shown in FIG. 4 and that some of the blocks shown in FIG. 4 may be omitted. Additionally, the processes associated with blocks 402 through 408 may be performed in a different order than what is shown in FIG. 4.

Figure 5:
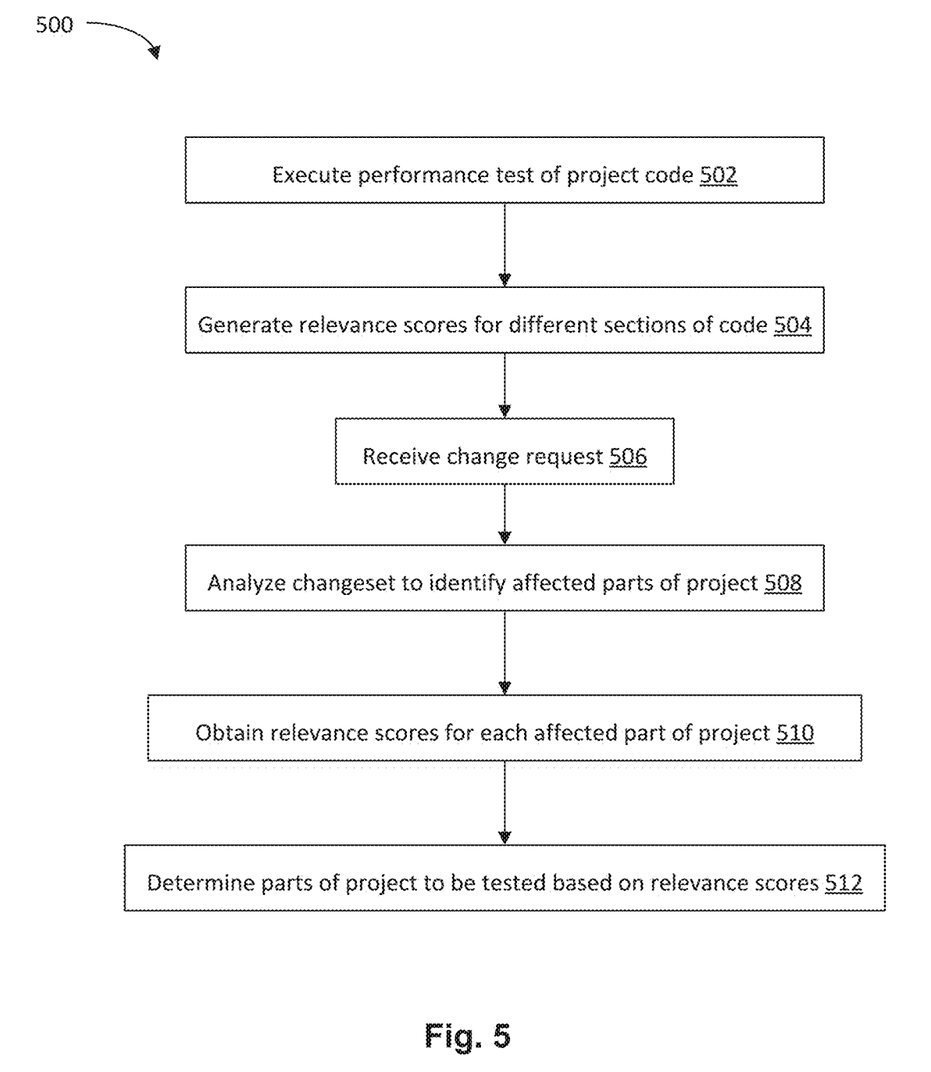
FIG. 5 is a method of generating a relevance score, in accordance with some embodiments of the present disclosure.

FIG. 5 is a method of generating a relevance score, in accordance with some embodiments of the present disclosure. Method 500 may be performed by processing logic that may include hardware, software, firmware, or a combination thereof. In some embodiments, at least a portion of method 500 may be performed by the governance service 118 shown in FIGS. 1 and 2. The method may begin at block 502.

At block 502, a performance test of the project is executed. The performance test may involve executing portions of the project code to determine its behavior and resource consumption. During the performance test a profiler may track various performance characteristics and associate them with particular sections of code. For example, the performance characteristic may be CPU utilization, memory utilization, network bandwidth utilization, and other factors.

At block 504, relevance scores may be computed for different sections of code. The relevance score can be used to indicate the degree of importance of a particular section of code. The sections of code within the project may receive a relevance score based on the recorded performance characteristics, such that the score reflects the degree to which section of code consumes processing resources. For example, classes that consume more processing resources may be more highly scored than classes that consume less processing resources. The resulting data may be stored to the project metadata 210 FIG. 2 (e.g., critical zones data 216). The data may be updated or added to each time a new performance test is performed.

At block 506, a new change request is received. The change request may be received by the governance service 118 from the SCM 116.

At block 508, the changeset is analyzed to identify the parts of the project that the contribution will affect. For example, a list all of the classes affected by the changeset may be generated.

At block 508, the relevance scores for each section of the project (e.g., each class, each method, etc.) may be obtained from the project metadata.

At block 510, the relevance scores for each section of code are used to determine which sections of the project will be tested. For example, a system administrator may define a threshold relevance score, such that any portions with a relevance score above the threshold will be tested and portions below the relevance score will not be tested. In some embodiments, the identified performance tests can be configured automatically. For example, the governance service 118 may generate a build profile 228 and/or deployment profile 230 to specify how to build and deploy the current software project for testing. In some embodiments, performance tests can be triggered to execute automatically within the CI environment. Additionally, the identified performance tests may be included in a report allowing the change request reviewer to make a final decision about what tests to perform.

It will be appreciated that embodiments of the method 500 may include additional blocks not shown in FIG. 5 and that some of the blocks shown in FIG. 5 may be omitted. Additionally, the processes associated with blocks 502 through 510 may be performed in a different order than what is shown in FIG. 5.

Figure 6:
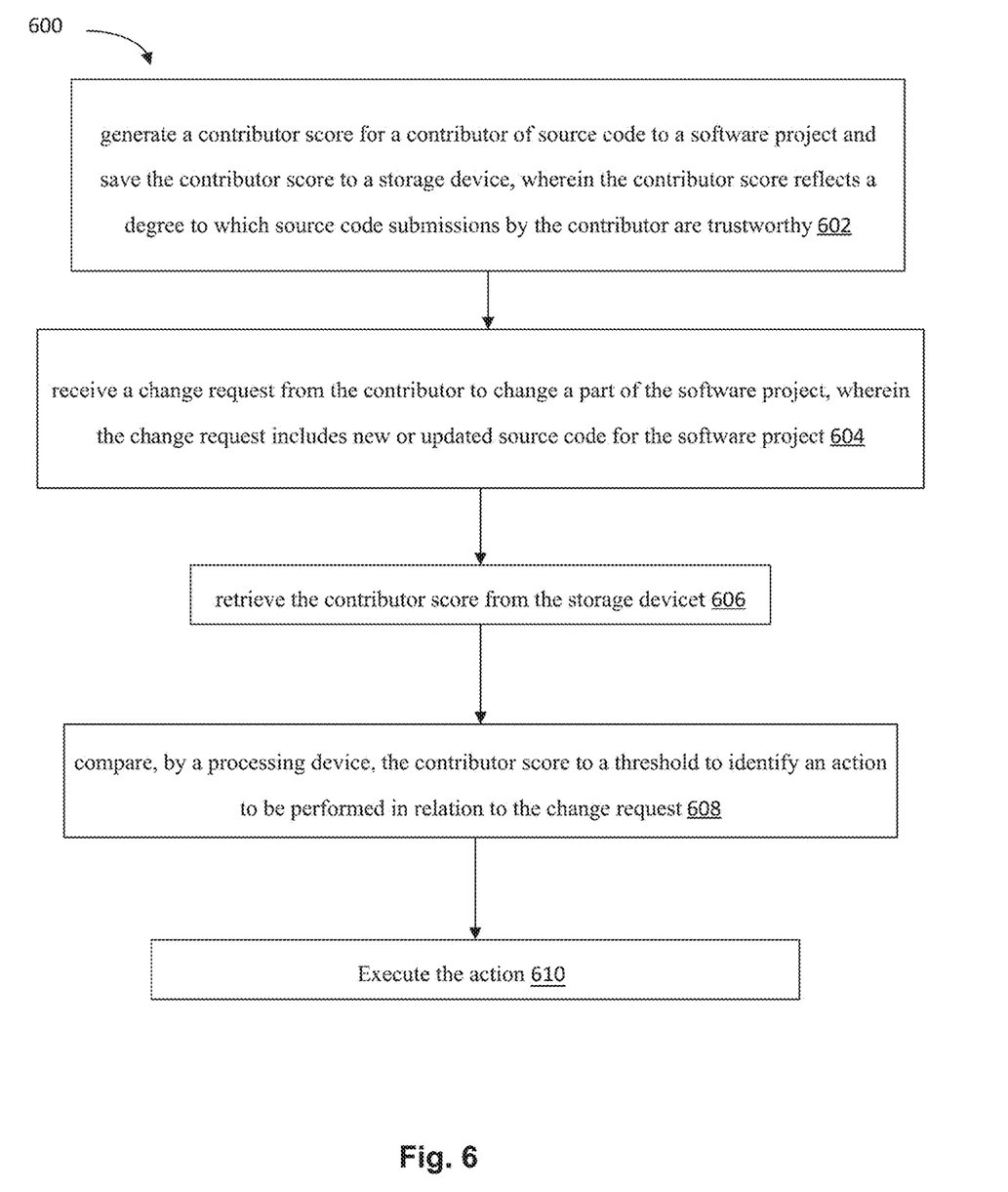
FIG. 6 is a process flow diagram summarizing a method of processing a change request in accordance with some embodiments of the present disclosure.

FIG. 6 is a process flow diagram summarizing a method of processing a change request in accordance with some embodiments of the present disclosure. Method 600 may be performed by processing logic that may comprise hardware, software, firmware, or a combination thereof. In some embodiments, at least a portion of method 600 may be performed by the governance service shown in FIGS. 1 and 2. The method may begin at block 602.

At block 602, a contributor score is generated for a contributor of source code to a software project. The contributor score reflects a degree to which source code submissions by the contributor are trustworthy. The contributor score may be saved to memory and/or a storage device for storing user metadata.

At block 604, a change request is received from the contributor to change a part of the software project. The change request includes new or updated source code for the software project, and can also include additional metadata such as a user ID. Block 606, 608, and 610 may be performed in response receiving a change request from the contributor.

At block 606, the contributor score is retrieved from the storage device. The contributor score may be identified according to the user ID associated with the change request.

At block 608, the contributor score is compared to a threshold to identify an action to be performed by the processing device in relation to the change request. The action may include accepting or rejecting the change request, generating a report of the change request to be reviewed by a change request reviewer, assigning source code reviewers to review the source code associated with the change request, automatically sending alerts to the reviewers, determining portions of the software project to test, and others.

At block 610, the action identified at block 608 is performed by the processing device. The action may be any one of the governance service actions described herein as well as others.

It will be appreciated that embodiments of the method 600 may include additional blocks not shown in FIG. 6 and that some of the blocks shown in FIG. 6 may be omitted. Additionally, the processes associated with blocks 602 through 610 may be performed in a different order than what is shown in FIG. 6.

Figure 7:
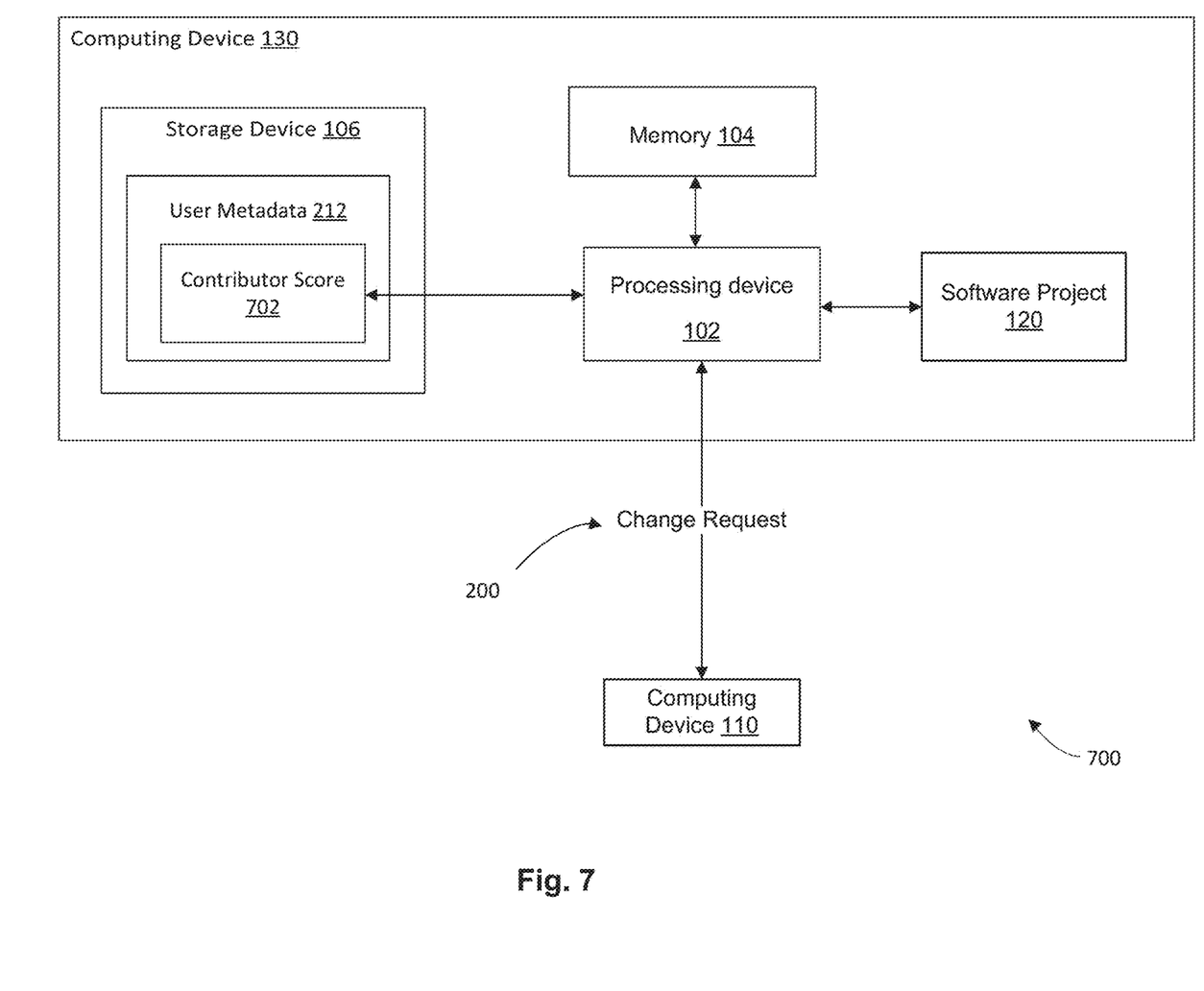
FIG. 7 is a block diagram of a system for processing a change request for a software project in accordance with some embodiments of the present disclosure.

FIG. 7 is a simplified block diagram of a system for processing a change request in accordance with some embodiments of the present disclosure. The system 700 includes a processing device 102 operatively coupled to a memory 104. The memory 104 can include instructions that are executable by the processing device 102 to cause the processing device 102 to process a change request 200. The processing device 102 may also be operatively coupled to a storage device 106 that includes user metadata 212.

The processing device 102 is communicatively coupled to a contributor's computing device 110. The processing device 102 is configured to receive the change request 200 from the computing device 110 to change a part of the software project. The change request 200 includes new or updated source code for the software project. In response to receiving the change request 200, the processing device 102 retrieves the contributor score 702 from the storage device 106, compares the contributor score 702 to a threshold to identify an action to be performed by the processing device 102 in relation to the change request, and performs the identified action. The action may include accepting or rejecting the change request, generating a report of the change request to be reviewed by a change request reviewer, assigning source code reviewers to review the source code affected by the change request, automatically sending alerts to the reviewers, determining portions of the software project to test, and others. It will be appreciated that embodiments of the system 700 may include additional blocks not shown in FIG. 7 and that some of the blocks shown in FIG. 7 may be omitted.

Figure 8:
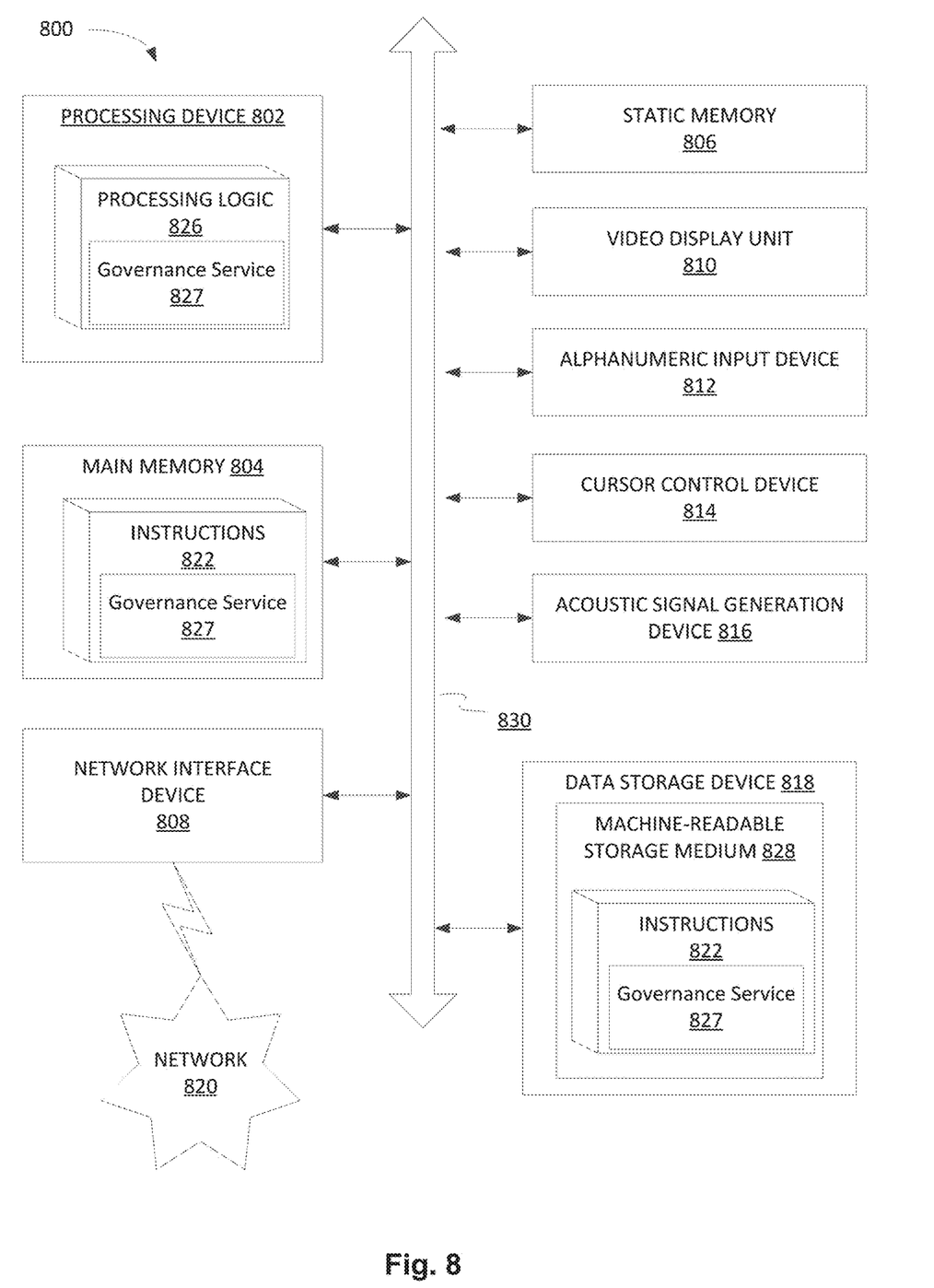
FIG. 8 illustrates a diagrammatic representation of a machine in the example form of a computer system within which a set of instructions, for causing the machine to perform any one or more of the methodologies discussed herein, may be executed.

FIG. 8 illustrates a diagrammatic representation of a machine in the example form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a web appliance, a server, and other machines capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a server, such as a cloud server, configured as a developer platform for building, storing, testing, and distributing software packages.

The exemplary computer system 800 includes a processing device 802, a main memory 804 (e.g., read-only memory (ROM), flash memory, dynamic random access memory (DRAM), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein. For example, the processing logic 826 may include logic for performing the functions of a governance service 118.

The data storage device 818 may include a machine-readable storage medium 828, on which is stored one or more set of instructions 822 (e.g., software) embodying any one or more of the methodologies of functions described herein, including instructions to cause the processing device 802 to perform the functions of the governance service 118. The instructions 822 may also reside, completely or at least partially, within the main memory 804 or within the processing device 802 during execution thereof by the computer system 800; the main memory 804 and the processing device 802 also constituting machine-readable storage media. The instructions 822 may further be transmitted or received over a network 820 via the network interface device 808.

While the machine-readable storage medium 828 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
generating a contributor score for a contributor of source code to a software project and saving the contributor score to a storage device, wherein the contributor score reflects a degree to which source code submissions by the contributor are trustworthy;
executing a performance test of the software project, generating a relevance score for each section of the software project based on results of the performance test, and storing the relevance score to the storage device, wherein the relevance score for a particular section indicates a degree to which that particular section consumes processing resources during execution;

receiving a change request from the contributor to change a part of the software project, wherein the change request includes new or updated source code for the software project; and in response to receiving the change request:
　identifying sections of the software project affected by the new or updated source code;
　for each identified section, retrieving the relevance score for the identified section, and determining whether to performance test the identified section based on the relevance score;
　retrieving the contributor score from the storage device;
　comparing, by a processing device, the contributor score to a threshold to identify an action to be performed in relation to the change request; and
　executing the action.

2. The method of claim 1, wherein the action comprises generating a report that describes the change request and includes the contributor score, the method further comprising automatically sending the generated report to a change request reviewer.

3. The method of claim 2, wherein the contributor score is one contributor score among a plurality of contributor scores for the contributor, wherein the each of the plurality of contributor scores applies to a particular section of the software project, and wherein generating the report comprises associating a section of the source code with a corresponding one of the plurality of contributor scores for the particular section of the software project affected by the section of the source code.

4. The method of claim 1, wherein the storage device stores contributor scores for a plurality of additional contributors identified as possible reviewers, the method further comprising identifying a reviewer among the possible reviewers to review the source code based on the contributor score associated with the reviewer.

5. The method of claim 1, wherein generating the contributor score comprises:
　identifying previous source code committed to the software project for the contributor; and
　determining how much of the previous source code is still included in the software project unchanged.

6. A system comprising:
　a memory; and
　a processing device, operatively coupled to the memory, the processing device to:
　　generate a contributor score for a contributor of source code to a software project and save the contributor score to a storage device, wherein the contributor score reflects a degree to which source code submissions by the contributor are trustworthy;
　　execute a performance test of the software project, generate a relevance score for each section of the software project based on results of the performance test, and store the relevance score for each section of the software project to the storage device, wherein the relevance score for a particular section indicates a degree to which the particular section consumes processing resources during execution;
　　receive a change request from the contributor to change a part of the software project, wherein the change request includes new or updated source code for the software project; and
　　in response to the change request:
　　　identify sections of the software project affected by the new or updated source code; and
　　　for each identified section, retrieve the relevance score for the identified section, and determine whether to performance test the identified section based on the relevance score;
　　　retrieve the contributor score from the storage device;
　　　compare the contributor score to a threshold to identify an action to be performed in relation to the change request; and
　　　execute the action.

7. The system of claim 6, wherein the action comprises to add the change request and the contributor score to a report, and automatically send the generated report to a change request reviewer.

8. The system of claim 6, wherein the storage device stores contributor scores for a plurality of additional contributors identified as possible reviewers, and the processing device is further to:
　identify a reviewer among the possible reviewers to review the source code based on the contributor score associated with the reviewer; and
　generate a notification and send the notification to the identified reviewer to alert the reviewer that the reviewer has been assigned to review the source code.

9. The system of claim 6, wherein to generate the contributor score, the processing device is to:
　weigh the contributor score more heavily based on the relevance score associated with sections of the software project affected by the previous source code committed to the software project by the contributor.

10. The system of claim 6, wherein to generate the contributor score, the processing device is to:
　identify previous source code committed to the software project for the contributor; and
　determine how much of the previous source code is still included in the software project unchanged.

11. A non-transitory computer-readable storage medium including instructions that, when executed by a processing device, cause the processing device to:
　execute a performance test of a software project, generate a relevance score for each section of the software project based on results of the performance test, and store the relevance score to the storage device, wherein the relevance score for a particular section indicates a degree to which that particular section consumes processing resources during execution;
　receive a change request from a contributor to change a part of the software project, wherein the change request includes new or updated source code for the software project; and
　in response to the change request:
　　identify sections of the software project affected by the new or updated source code;
　　for each identified section, retrieve the relevance score for the identified section, and determine whether to performance test the identified section based on the relevance score;
　　retrieve a contributor score from a storage device, wherein the contributor score reflects a degree to which source code submissions by the contributor are trustworthy;
　　compare, by the processing device, the contributor score to a specified threshold to identify an action to be performed in relation to the change request; and
　　execute the action.

12. The non-transitory computer-readable storage medium of claim 11, wherein the action comprises to add the change request and the contributor score to a report, and automatically send the generated report to a change request reviewer.

13. The non-transitory computer-readable storage medium of claim 11, wherein the storage device stores contributor scores for a plurality of additional contributors identified as possible reviewers, and the processing device is further to:
   identify a reviewer among the possible reviewers to review the source code based on the contributor score associated with the reviewer; and
   generate a notification and send the notification to the identified reviewer to alert the reviewer that the reviewer has been assigned to review the source code.

14. The non-transitory computer-readable storage medium of claim 11, wherein to generate the contributor score, the processing device is to:
   identify previous source code committed to the software project for the contributor; and
   determine how much of the previous source code is still included in the software project unchanged.

\* \* \* \* \*